(12) United States Patent
Jang

(10) Patent No.: US 12,213,623 B2
(45) Date of Patent: Feb. 4, 2025

(54) GRILL PLATE CAPABLE OF PREVENTING SOOT GENERATION

(71) Applicant: In Sang Jang, Hwaseong-si (KR)

(72) Inventor: In Sang Jang, Hwaseong-si (KR)

( * ) Notice: Subject to any disclaimer, the term of this patent is extended or adjusted under 35 U.S.C. 154(b) by 991 days.

(21) Appl. No.: 16/968,360

(22) PCT Filed: Jan. 30, 2019

(86) PCT No.: PCT/KR2019/001305
§ 371 (c)(1),
(2) Date: Aug. 7, 2020

(87) PCT Pub. No.: WO2019/156417
PCT Pub. Date: Aug. 15, 2019

(65) Prior Publication Data
US 2021/0113017 A1 Apr. 22, 2021

(30) Foreign Application Priority Data
Feb. 9, 2018 (KR) .................. 10-2018-0016508

(51) Int. Cl.
*A47J 37/07* (2006.01)
*F24B 3/00* (2006.01)

(52) U.S. Cl.
CPC ....... *A47J 37/0786* (2013.01); *A47J 37/0781* (2013.01); *A47J 2037/0777* (2013.01); *F24B 3/00* (2013.01)

(58) Field of Classification Search
CPC ............. A47J 2037/0777; A47J 37/067; A47J 37/0781; A47J 37/0786; F24B 3/00
USPC .......................................................... 99/446
See application file for complete search history.

(56) References Cited

U.S. PATENT DOCUMENTS

| 4,462,306 A * | 7/1984 | Eisendrath ............ A47J 37/067 |
| | | 15/236.01 |
| 4,541,406 A * | 9/1985 | DaSambiagio ......... F24B 1/205 |
| | | 99/446 |
| 2006/0054029 A1 | 3/2006 | Lauro |
| 2014/0345479 A1 | 11/2014 | Ahmed |

FOREIGN PATENT DOCUMENTS

| CN | 204146889 U | 2/2015 |
| JP | 2006263405 | 10/2006 |
| KR | 2020080001970 | 6/2008 |
| KR | 20090129567 | 12/2009 |

(Continued)

OTHER PUBLICATIONS

International Search Report—PCT/KR2019/001305 dated May 8, 2019.

(Continued)

*Primary Examiner* — Joe E Mills, Jr.
(74) *Attorney, Agent, or Firm* — CANTOR COLBURN LLP

(57) ABSTRACT

Provided is a grill plate that prevents the generation of soot, and the grill plate that prevents the generation of soot comprises: a grill body that is foldable to form peaks and valleys; supporting frames that are provided with oil collecting passages for collecting oil collected in the valleys while supporting the valleys of the grill body at the lower side of the grill body; and first and second supporting members that each support each of both ends of the supporting frame.

4 Claims, 2 Drawing Sheets

(56) References Cited

FOREIGN PATENT DOCUMENTS

KR    101360884    2/2014
KR    101669632    10/2016

OTHER PUBLICATIONS

Chinese Office Action—Chinese Application No. 201980012257.X issued on Jul. 22, 2022, citing CN 204146889 and US 2006/0054029.

* cited by examiner

GRILL PLATE CAPABLE OF PREVENTING SOOT GENERATION

FIELD OF THE INVENTION

The present invention relates to a grill plate, and more specifically, relates to a grill plate capable preventing the generation of smoke and soot caused by oil coming from meat during grilling meat falling into a heat source such as charcoal.

BACKGROUND OF THE INVENTION

In general, there are several types of cooking meat for eating. That is, there are a meat-roasting method of placing a plate over gas fire by means of gas as a heat source for roasting meat, a charcoal grill method of grilling meat by firing charcoal placed in a brazier and putting a grill disclosed in Korean Utility Model Publication No. 20-2008-0001970 over charcoal fire, and the like.

Meanwhile, the taste of a charcoal-grilled meat product is better than that of a roasted meat product, and the demand for the charcoal-grilled meat product has been increasing. The Charcoal grill method for grilling meat using this charcoal fire makes far infrared rays emitted by a charcoal fire penetrate deep into the meat to improve the taste of the meat by placing the grill over charcoal fire of the brazier and grilling the meat directly with the heat of the charcoal fire.

However, the charcoal grill causes the oil flowing from the meat to fall directly onto the charcoal fire, and the oil dropped on the charcoal fire is burned to generate a large amount of smoke. This smoke not only makes the eyes of people who grill meat sting, but also contains fine dust, therefore the charcoal grill method has the problem such as adversely affecting the health of people who grill meat. In addition, it has the problems such as pollution of an interior space by the smoke and weakening of the thermal power of the charcoal due to falling of oil on the charcoal.

The most important problem is that the oil falls on charcoal thereby generating smoke, and soot generated together with smoke sticks to the surface of meat. Further, this is a medically proven carcinogen.

However, even though the grilled meat is greatly harmful to the health, people are still eating the grilled meat because it tastes good.

DETAILED DESCRIPTION OF THE INVENTION

Technical Problem

The problem to be solved of the present invention is to be devised in consideration of the above-described problems, and to provide a grill plate that can prevent smoke and soot generated during grilling meat because oil coming from meat falls into a heat source such as charcoal.

The objects of the present invention are not limited to those mentioned above, and other objects not mentioned will be clearly understood by a person skilled in the art from the following description.

Means for Solving the Problem

A grill plate that prevents the generation of soot according to the present invention for achieving the object to be solved by the present invention as described above, comprises: a grill body that is foldable to form peaks and valleys; supporting frames that are provided with oil collecting passages for collecting oil collected in the valleys while supporting the valleys of the grill body at the lower side of the grill body; and first and second supporting members that each support each of both ends of the supporting frame.

Here, the grill body may include a plurality of auxiliary grills including a wire mesh and a grill frame supporting the rim of the wire mesh; and a connecting member rotatably connecting the grill frames of the plurality of auxiliary grills.

In addition, the first supporting member includes: a first supporting groove into which one end of the supporting frame is fitted; a first oil discharge passage through which oil collected through the oil collecting passage of the supporting frame flows; and a first oil discharge port through which oil flowing in the first oil discharge passage is discharged, and the second supporting member includes: a second supporting groove into which one end of the supporting frame is fitted; a second oil discharge passage through which oil collected through the oil collection passage of the supporting frame flows; and a second oil discharge port through which oil flowing in the second oil discharge passage is discharged, and each of the first and second oil collection containers may be disposed below each of the first and second oil discharge ports.

In addition, a first table including a first folding leg and one ends of each of the first and second supporting members being slidably and detachably coupled; and a second table including a second folding leg and the other ends of each of the first and second supporting members being slidably and detachably coupled.

According to the grill plate in which the generation of soot is prevented according to the present invention, the occurrence of smoke and soot is prevented by preventing the oil generated from meat from falling into a heat source such as charcoal fire while grilling the meat.

The Effect of the Invention

The effects of the present invention are not limited to those mentioned above, and other effects not mentioned will be clearly understood by those skilled in the art from the following description.

MODE FOR CARRYING OUT THE INVENTION

Figure 1:
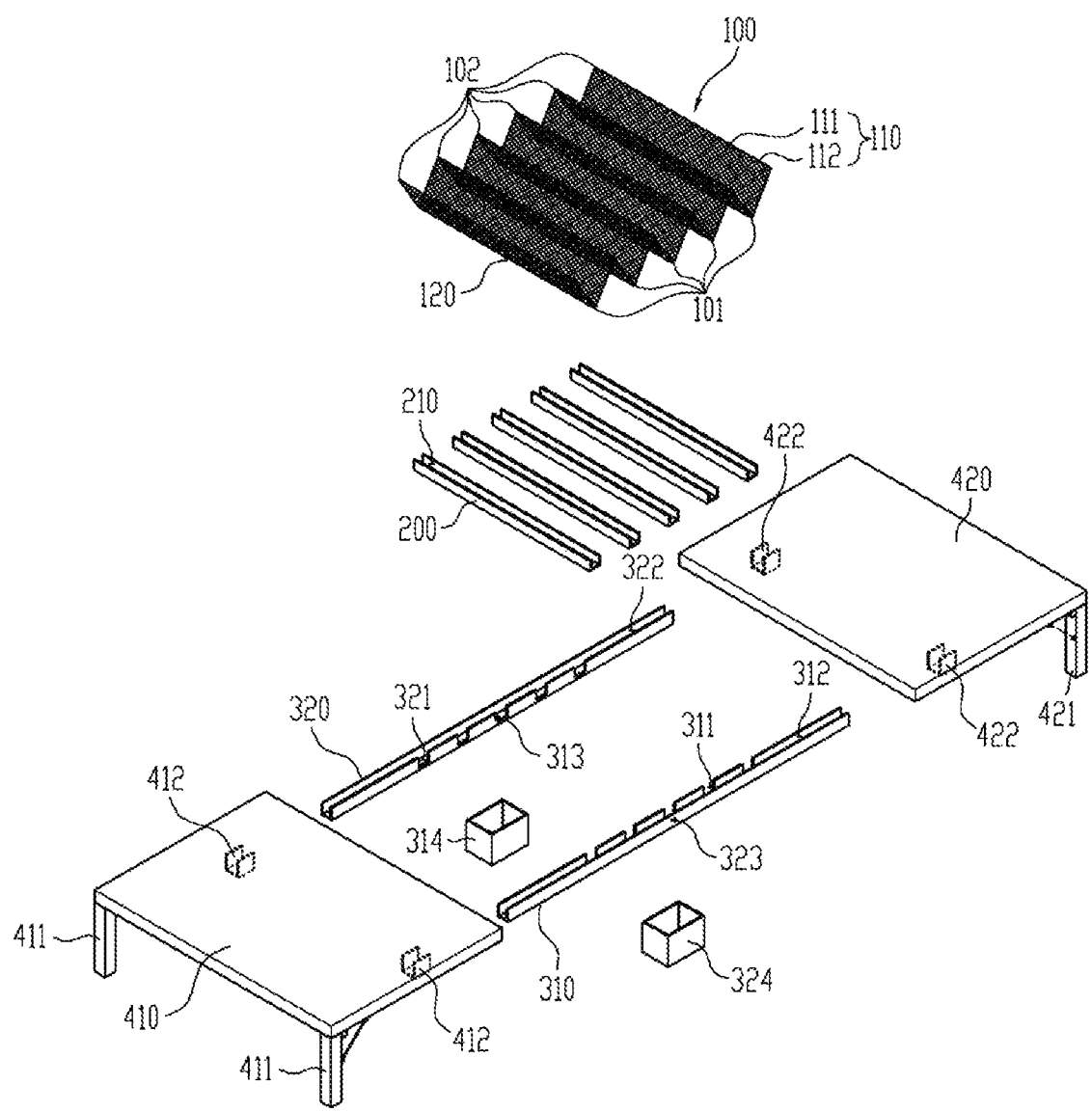
FIG. 1 is an exploded perspective view schematically showing a grill plate that prevents the generation of soot according to an embodiment of the present invention.

Only the present embodiments are provided to make the publication of the present invention complete, and to fully inform the person of ordinary skill in the art to which the present invention pertains, the scope of the invention, and the present invention is defined by the scope of the claims. It just works. The same reference numerals refer to the same components throughout the specification.

Unless otherwise defined, all terms (including technical and scientific terms) used in the present specification may be used as meanings commonly understood by those skilled in the art to which the present invention pertains. In addition, terms defined in a commonly used dictionary are not ideally or excessively interpreted unless specifically defined.

The terminology used herein is for describing the embodiments and is not intended to limit the present invention. In the present specification, the singular form also includes the plural form unless otherwise specified in the phrase. As used herein, "comprises" and/or "comprising" does not exclude the presence or addition of one or more other components other than the components mentioned.

Hereinafter, a grill plate capable of preventing the generation of soot according to an embodiment of the present invention will be described with reference to the drawings.

Figure 2:
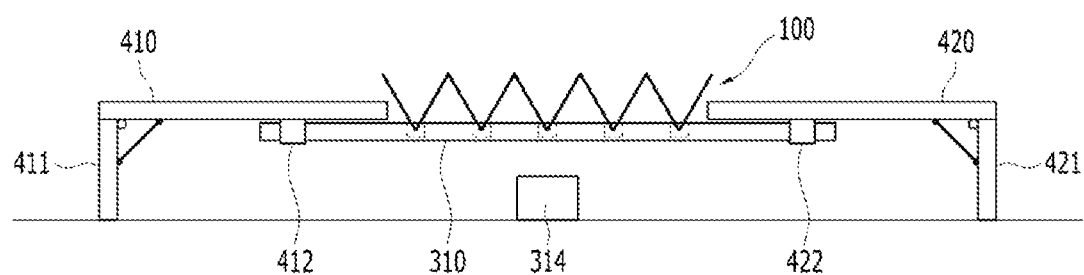
FIG. 2 is a side view showing a grill plate that prevents the generation of soot according to an embodiment of the present invention.

FIG. 1 is an exploded perspective view schematically showing a grill plate capable of preventing the generation of soot generation according to an embodiment of the present invention, and FIG. 2 is a side view showing a grill plate capable of preventing the generation of soot according to an embodiment of the present invention.

FIGS. 1 and 2, a grill plate 10 that prevents the generation of soot according to an embodiment of the present invention may comprise a grill body 100 that is curvedly foldable to form valleys 101 and peaks 102; supporting frames 200 that are provided with oil collecting passages 210 for collecting oil collected in the valleys 101 while supporting the valleys 101 of the grill body 100 at the lower side of the grill body 100; first and second supporting members 310, 320 that support both ends of the supporting frames 200.

The grill body 100 may comprise a plurality of auxiliary grills 110 which each include a wire mesh 111 and a grill frame 112 for supporting the rim of the wire mesh 111; and a connection member 120 which is connected to the grill frames 112 of the plurality of auxiliary grills 110 such that the grill frames 112 are pivotably rotated. Therefore, the grill body 100 can be folded curvedly so that the valleys 101 and the peaks 102 are formed, as shown in FIG. 1. Here, the connection member 120 may be implemented as a connection ring made of metal.

The supporting frame 200 has a length corresponding to the width of the grill body 100 or a length longer than the width of the grill body 100, and is formed of a C-shaped steel in which the oil collection passage 210 is formed in the longitudinal direction and in which the upper portion thereof is opened. In addition, the valleys 101 of the grill body 100 may be seated in the oil collecting passages 210. Therefore, when meat is grilled in the grill body 100 while the valleys 101 of the grill body 100 are seated in the oil collecting passages 210, oil coming from the meat is collected in the valleys 101 of the grill body 100 along the surface of the grill body 100, and the oil collected in the valleys 101 of the grill body 100 falls to the oil collecting passages 210 of the supporting frames 200, and the oil dropped in the oil collecting passages 210 is then discharged to some or all of both ends of the supporting frames 200.

Meanwhile, the number of the supporting frames 200 is equal to or greater than the number of the valleys 101 formed in the grill body 100, in order that all the valleys 101 formed in the grill body 100 can be supported.

In addition, the grill plate 10 capable of preventing the generation of soot according to one embodiment of the present invention comprises a first supporting member 310 provided with first supporting grooves 311 to which one ends of the supporting frames 200 are fitted; and a second supporting member 320 provided with second supporting grooves 321 to which the other ends of the supporting frames 200 are fitted. Here, first and second oil discharge passages 312 and 322 through which oil collected in the oil collecting passages 210 of the supporting frames 200 flows may be formed in the first and second supporting members 310 and 320, respectively. Further, first and second oil discharge ports 313 and 323, through which oil flowing in the first and second oil discharge passages 312 and 322 are discharged, may be formed in the first and second supporting members 310 and 320, respectively. In addition, the first and second oil collection containers 314 and 324 may be disposed under the first and second oil discharge ports 313 and 323, respectively. Accordingly, the oil collected in the valleys 101 of the grill body 100 can be collected in the first and second oil collection containers 314 and 324.

In addition, in the grill plate 10 capable of preventing the generation of soot according to one embodiment of the present invention, the first supporting member 310 to which one ends of the supporting frames 200 are fitted is formed to be relatively higher or lower than the second supporting member 320 to which the other ends of the supporting frames 200 are fitted. In this way, the first supporting member 310 and the second supporting member 320 are installed to be inclined, so that the oil collected in the oil collecting passages 210 can be easily discharged from the supporting frames 200.

In addition, the grill plate 10 that prevents the generation of soot according to one embodiment of the present invention may comprise a first table 410 including first foldable legs 411 and one ends of the first and second supporting members 310 and 320 being slidably and detachably coupled; and a second table 420 including second foldable legs 421 and the other ends of the first and second supporting members 310 and 320 being slidably and detachably coupled. In addition, first and second sliding guides 412 and 422 on which the one ends and the other ends of the first and second supporting members 310 and 320 slide may be coupled to the lower surfaces of the first and second tables 410 and 420, respectively. Accordingly, a heat source such as a charcoal brazier and a gas burner can be easily disposed under the grill body 100. In addition, a user can put food such as meat on the upper surfaces of the first and second tables 410 and 420.

In addition, in the grill plate 10 capable of preventing the generation of soot according to one embodiment of the present invention, the first and second supporting members 310,320 are formed so that the height is lowered from both ends towards the central portion where the first and second oil discharge ports 313, 323 are formed, that is, are formed in a V-shape. Accordingly, it is easy that the oil flowing through the first and second oil discharge passages 312 and 322 flows toward the first and second oil discharge ports 313 and 323 and is then discharged through the first and second oil discharge ports 313 and 323.

In addition, the grill body 100, the supporting frame 200, the first and second supporting members 310 and 320, the first and second tables 410, 420 of the grill plate 10 may be disassembled from each other. Accordingly, the volume of the disassembled grill plate 10 that prevents the generation of soot according to an exemplary embodiment of the present invention may be reduced, which makes it easy to carry and store.

Hereinafter, the operation and effect of the grill plate that prevents the generation of soot according to an embodiment of the present invention will be described with reference to the drawings.

Figure 3:
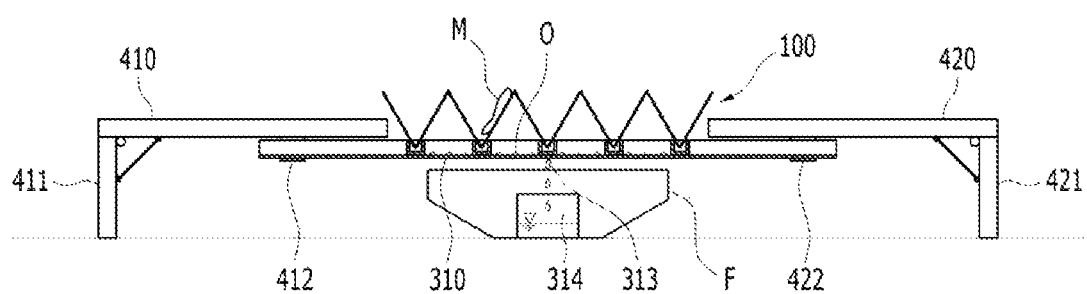
FIG. 3 is a view for explaining the operation and effect of the grill plate capable of preventing the generation of soot according to an embodiment of the present invention.

FIG. 3 is a view for describing the operation and effect of the grill plate capable of preventing the generation of soot according to an embodiment of the present invention.

With reference to FIGS. 1 and 3, first, when grilling meat, the grill plate 10 for preventing the generation of soot according to an embodiment of the present invention is assembled. Then, charcoal brazier F is placed on the lower side of the grill plate 10 for preventing the generation of soot, and meat M is placed on the grill body 100 and is then grilled. In this way, as the meat M is grilled, oil O is generated from the surface of the meat M. At this time, the oil O generated from the surface of the meat M flows along the surface of the grill body 100 and then collects in the valleys 101 of the grill body 100 and then falls into the oil collecting passages 210 of the supporting frames 200. Accordingly, the oil O generated from the surface of the meat M does not fall into a charcoal brazier F, so that smoke and soot are not generated.

In addition, the oil O dropped on the oil collecting passages 210 of the supporting frames 200 flows along the oil discharge passages 312 and 322 of the first and second supporting members 310 and 320 and is then collected in the first and second oil collection containers 314 and 324 by passing through the oil discharge ports 313 and 323. Accordingly, contamination of the surroundings by the oil O may be prevented.

Although embodiments of the present invention have been described above with reference to the accompanying drawings, those skilled in the art to which the present invention pertains may implement the present invention in other specific forms without changing its technical spirit or essential features. Therefore, it should be understood that the embodiments described above are illustrative in all respects and not restrictive.

INDUSTRIAL AVAILABILITY

The present invention provides a grill plate capable of preventing the generation of smoke and soot by collecting the oil generated from meat during grilling meat in the valleys of a grill body and then falling into an oil collecting passages, thereby preventing falling into a heat source such as charcoal. Therefore, the present invention can be industrially applicable.

What is claimed is:

1. A grill plate capable preventing soot generation, comprising:
   a grill body that is curvedly foldable to form peaks and valleys;
   supporting frames provided with oil collecting passage for collecting the oil collected in the valleys while supporting the valleys of the grill body at the lower side of the grill body; and
   first and second supporting members that support each of both ends of the supporting frames.

2. The grill plate according to claim 1, wherein the grill body comprises:
   a plurality of auxiliary grills including a wire mesh and a grill frame supporting the rim of the wire mesh; and
   a connecting member rotatably connecting the grill frames of the plurality of auxiliary grills.

3. The grill plate according to claim 1, wherein the first supporting member includes:
   a first supporting groove into which one end of the supporting frame is fitted;
   a first oil discharge passage through which oil collected through the oil collecting passage of the supporting frame flows; and
   a first oil discharge port through which oil flowing in the first oil discharge passage is discharged,
   wherein the second supporting member includes:
   a second supporting groove into which one end of the supporting frame is fitted;
   a second oil discharge passage through which oil collected through the oil collection passage of the supporting frame flows; and
   a second oil discharge port through which oil flowing in the second oil discharge passage is discharged, and
   wherein each of the first and second oil collection containers is disposed below each of the first and second oil discharge ports.

4. The grill plate according to claim 1, comprising:
   a first table including a first folding leg and one ends of each of the first and second supporting members being slidably and detachably coupled; and
   a second table including a second folding leg and the other ends of each of the first and second supporting members being slidably and detachably coupled.

* * * * *